Dec. 17, 1929.   G. HYMAN   1,739,837
ADVERTISING SIGN
Filed June 6, 1928
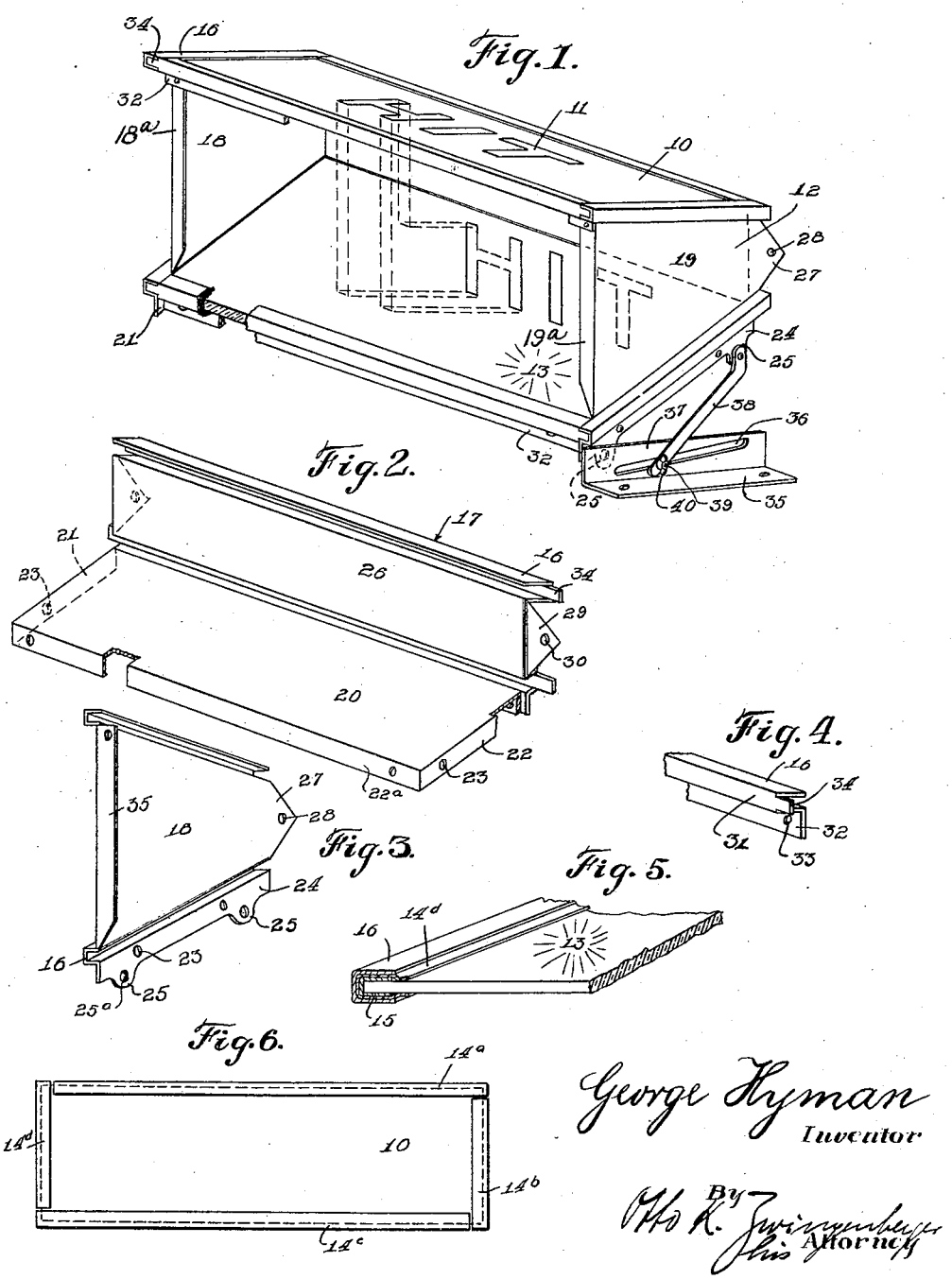

Patented Dec. 17, 1929

1,739,837

UNITED STATES PATENT OFFICE

GEORGE HYMAN, OF NEW YORK, N. Y.

ADVERTISING SIGN

Application filed June 6, 1928. Serial No. 283,425.

This invention relates to advertising signs illuminated exclusively by day light. With this purpose in view the invention consists in the arrangement of a mirror with a colored glass plate being impervious to light except at those places where a stencil or lettering is intended to stand, the lettering to be reflected by the mirror so as to carry any desired notice to the people at places where such advertisement can be noticed simultaneously by a great number of people.

It is the object of the invention to create a sign which can be secured at the top of a fence, of a wall, on the roof of a house, of a wagon. It is particularly with the latter use where my invention comes in because if the advertising sign is mounted on the roof of a wagon, or of an automobile, or any other vehicle, the advertising sign is very much subject to concussions which are occasionally so strong that the colored glass plate or the mirror, both which form the essential elements of my new advertising sign, are broken. It is also in connection with the shipping of the signs that precautions have been found necessary to provide means which will release the glass plate and the mirror of any strains upon them so as to avoid their fracture and the loss sustained thereby. For the better understanding of my invention reference is had to the following description and to the accompanying drawings illustrating my invention, in which drawings Fig. 1, is a perspective view of my new advertising sign, the said sign receiving the light directly from above and the beams of light passing through the stencil thereby illuminating the letters and projecting them upon the mirror from which they are reflected to the front and become visible at a long distance. Certain parts of the device have been broken away so as to disclose more fully the relation of the parts to each other.

Figs. 2, 3, and 4 are perspective views of the parts constituting the open chamber or frame in which the stencil and the mirror are embodied.

Fig. 5, is a detailed view showing the relation between the means or parts holding the stencil or mirror, respectively, which means are adapted to release or to avoid pressure upon said stencil or mirror.

Fig. 6, shows the arrangement of the holding means in direct contact with the stencil, or mirror.

A stencil 10, made of glass impervious to light, except at those spaces where it is provided with transparent lettering 11, is arranged in a more or less horizontal position in a chamber or frame 12, in the lower part of which a mirror 13 is arranged in some distance from, and ascendingly with its rear end towards, the aforesaid stencil 10.

The open frame or chamber 12 is to be put together by the various parts illustrated by Figures 2-6. It will be noticed from Figure 6 that for instance the stencil 10, and likewise the mirror 13, is surrounded at its edges by rails $14^a$, $14^b$, $14^c$, $14^d$. These rails are of U-shaped cross-section, the outer ends of which are first bent inwardly and then flare somewhat outwardly; the inner walls of the straight part of these U-shaped rails $14^a$, $14^b$, $14^c$, $14^d$, are covered with some soft material 15, for instance with woolen cloth, cotton, cork or the like material. From an inspection of Figure 6 it will furthermore be noticed that the rails $14^a$, $14^b$, $14^c$, $14^d$, follow each other in a kind of a circle and abut each other in such manner that the following rail always stands perpendicular upon the preceding rail. The said rails $14^a$, $14^b$, $14^c$, $14^d$, holding for instance the stencil 10, or holding in a similar manner the mirror 13, are then inserted in the rail or groove 16, as provided on the rear wall of the center body 17 and the side walls 18 and 19. Both side walls 18 and 19 are congruent with each other and correspond with each other as the object to its image in a mirror.

It will furthermore be noticed that the bottom plate 20 of the center body 17 has flaps 21 and 22 depending at the sides, provided with holes 23. The side walls 18 and 19 are provided with rails or grooves 16 at their upper and lower edge and from the inside rim of the lower groove 16 a flap 24 is depending with lugs 25 at its lower edge and holes $25^a$ being provided therein. Said flaps 24 are furthermore provided with holes corresponding to the holes 23 so as to register with the holes 23 of the flaps 21 and 22 if flap 24 of the side walls 18 and 19 covers the flaps 21 and 22, respectively, of the bottom plate 20 of the center body 17. The side walls 18 and 19 are furthermore provided with flaps 27 provided with a hole 28. This flap 27, and hole 28, congrues and registers with the flap 29 and hole 30 projecting rearwardly from the back 26 of the center body 17.

It will be noticed from an inspection of Figure 1 that the rails or grooves 16 of the side walls 18 and 19 connect with the rails 16 of the back 26 when said side walls 18 and 19 are attached with their flaps 24 to the flaps 21 and 22, respectively, and are secured by means of bolt screws arranged in the holes 23. It will furthermore be noticed that upon assembling the side walls 18 and 19 with the center body 17 form a U-shaped frame, in the upper part of which the stencil 10 and in the lower part of which the mirror 13, respectively, can be inserted, each of them being surrounded by rails 14$^a$, 14$^b$, 14$^c$, 14$^d$ at its edges. In order to close this U-shaped frame on all four side rails 31, as illustrated by Fig. 4, consisting chiefly of a rail or groove 16 and a flap 32 with a perforation 33 near its sides, are secured by screw bolts to the flaps 18$^a$ and 19$^a$ extending from the front edge of the side walls 18 and 19, respectively, into the opening of the frame or chamber 12. Similarly the U-shaped frame holding the mirror is closed by a like rail 31, the flap 32 of the same being secured by screw bolts or the like means to the flap 22$^a$ of the bottom plate 20 of the center body 17. I want to state that before such rails 31 are secured at the upper front edge of the stencil 10 and at that of the mirror 13 below, of course, the rail 14$^c$ is inserted in the rail or groove 16 of said rails 31.

It may happen occasionally that at the corners of the rails or grooves 16 a gap is showing, which is of no concern, however, because one of the rails will close said gap and prevent rain, dust or the like agents from entering into the frame by such gaps; if desired, it may be arranged that flaps 34 are provided at both ends of said rails 31 for the purposes of more fully covering any such gap which in itself may be desirable for giving the chamber a more refined appearance. Similar flaps 34 are also shown at the ends of the rails or grooves 16 of the back 26 of the center body 17.

It has been mentioned in the beginning that the operation of the advertising sign is obtained by having a beam of light strike through the transparent lettering 11 of the stencil 10 that the picture of the transparent lettering is projected upon the mirror and reflected by the same towards the front to enter the eye of the spectator.

Inasmuch as the position of the stencil 10 is more or less substantially horizontal, it stands to reason, according to the law of optics, that the plane of the mirror 13 must be in an inclined position towards the stencil 10, the opening of the angle showing towards the spectator. In view of the necessity of having the mirror in an inclined position relative to that of the stencil it is highly desirable to adjust the position of the mirror in an easy and reliable manner. In order to accomplish this purpose, the flaps 24 of the side walls 18 and 19 are provided with the aforesaid lugs 25, which again are provided with apertures 25$^a$. An angle iron 35, or the like means, is provided on both sides of the advertising sign; said angle iron 35 is provided with a slot 36, which preferably ascends slightly towards the rear. The front lug 25 is hingedly connected with the perpendicular wall 37 of said angle iron and the two armed lever 38 is slidably arranged in said slot 36 by a screw threaded bolt 39 engaging a wing screw 40, while it is hingedly connected with its short arm to the rear lug 25. It is apparent from an inspection of Figure 1 that according to the position, in which the arm 38 is held in the slot 36, that the inclination of the mirror 13 can be regulated easily and satisfactorily in any inclination which may become necessary according to the place at which the sign is mounted. The sign may be erected on top of a wagon, or on top of a roof, or of a wall, or the like places and according to the height of any such locations in relation to the height of spectator it will be necessary to control the inclination in respect therewith.

What I claim is:

1. In an advertising sign in the form of an open chamber the combination with an inclined mirror and an impervious stencil, provided with lettering trasnparent to light, arranged substantially horizontally above said mirror, of a center body forming the bottom and back of the chamber, side walls connecting with the bottom and back of the center body, a groove at the upper and lower end of the back, a groove at the upper and lower end of each side wall converging towards the rear and abutting the upper and lower groove of the back, respectively, a flap depending from the lower groove of each side wall and from the sides of the bottom, rails consisting of a groove and a flap extending downwardly along the same, U-shaped rails with a soft lining inside embracing the edges of the mirror and stencil, and means holding the center body, the side walls and rails together.

2. In an advertising sign in the form of an open chamber the combination with an inclined mirror and an impervious stencil, provided with lettering transparent to light, arranged horizontally above said mirror, of a center body forming the bottom and back of the chamber, side walls connecting with the bottom and back of the center body, a groove at the upper and lower end of the back, a groove at the upper and lower end of each side wall converging towards the rear and abutting the upper and lower groove of the back, respectively, a flap depending from the lower groove of each side wall and from the sides of the bottom, rails consisting of a groove and a flap extending downwardly along the same, U-shaped rails with a soft lining inside, embracing the edges of the mirror and stencil, means holding the center body, the side walls and rails together, and means adapted to regulate the inclined position of the advertising sign.

3. In an advertising sign as described by claim 1, upwardly extending means provided with a rearwardly inclined slot and hingedly connected with a lug depending from the side wall near its front, and a double armed lever slidably arranged with the end of its long arm in the aforesaid slot and with the end of its short arm hingedly arranged to the lug depending from the side wall near its rear end.

In witness whereof I have hereunto set my hand.

GEORGE HYMAN.